June 25, 1968   D. H. BOHM   3,389,769
ELECTROMAGNETIC GEAR COUPLING HAVING MEANS
PRECLUDING MALFUNCTIONING THEREOF
Filed Feb. 18, 1966

United States Patent Office 3,389,769
Patented June 25, 1968

3,389,769
ELECTROMAGNETIC GEAR COUPLING HAVING MEANS PRECLUDING MALFUNCTIONING THEREOF
Dieter Heinz Bohm, Frondenberg, Germany, assignor to Maschinenfabrik Stromag G.m.b.H., Unna, Westphalia, Germany
Filed Feb. 18, 1966, Ser. No. 528,538
Claims priority, application Germany, Feb. 19, 1965, M 64,230
7 Claims. (Cl. 192—84)

ABSTRACT OF THE DISCLOSURE

Disclosed is an electromagnetic gear coupling including two pairs of spur gears angularly related in such a way that when one pair is in a position precluding torque-transmitting engagement thereof, the other pair is in a position allowing torque-transmitting engagement thereof, and vice versa.

---

Figure 1:
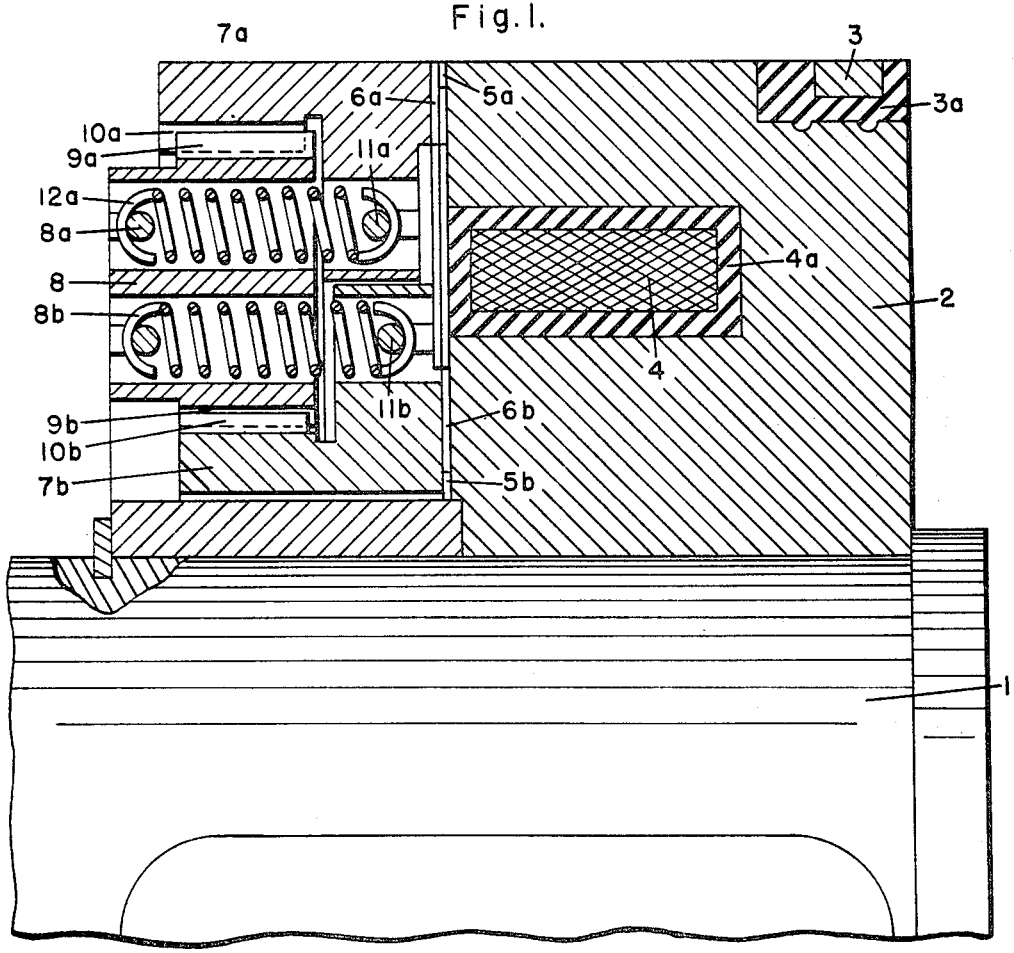

This invention relates to electromagnetic gear couplings for transmitting torque from a driving shaft to a driven shaft. In couplings of this description torque transmission is achieved by means of an engaging pair of ring-shaped spur gears. One of such a cooperating pair of gears is adapted to be shifted in the direction of the common axis of rotation of the pair of gears, as a result of which movement the teeth of one of the pair of gears are moved into the inter-tooth gaps of the other of the pair of gears, i.e., the gaps formed between the teeth of the other gear of the pair of gears. Each of the aforementioned pair of gears forms part of one of a pair of coupling members and in the engaged position of the pair of gears torque-transmission is effected from one coupling member to the other. If one of the pair of gears is moved axially out of cooperative engagement with the other of the pair of gears, i.e., if the pair of gears is separated, torque-transmission cannot take place any longer. Engagement of a pair of cooperating gears is effected by the action of a magnetic field established by a rotatable energizing winding.

It is a general object of this invention to provide improved electromagnetic gear couplings.

Gear couplings of the aforementioned description operate very satisfactorily once cooperative or torque-transmitting engagement between the two annular spur gears have been achieved. It happens, however, quite frequently that the teeth of one gear register with, and abut against, the teeth of the other gear when one of the pair of gears is shifted in a direction of the common axis of rotation of the pair of gears in an unsuccessful attempt to effect cooperative engagement of the pair of gears. Such failures of the pair of gears to properly engage are quite common. They result in excessive noise, and excessive wear, and may even result in the destruction of the malfunctioning coupling.

It is, therefore, another object of this invention to provide improved electromagnetic gear couplings which are not subject to the above limitations and drawbacks.

In couplings according to this invention each coupling member of a pair of cooperating coupling members includes a pair of coaxial ring-shaped spur-gears rather than but one single spur gear. The pair of gears of one of said pair of coupling members and the pair of gears of the other of said pair of coupling members are angularly related in such a way that when the teeth of one of said pair of gears of one of said pair of coupling members and the teeth of one of said pair of gears of the other of said pair of coupling members are in abutting registery, the teeth of the other of said pair of gears of said one of said pair of coupling members are in registry with the inter-tooth gaps of the other of said pair of gears of said other said pair of coupling members.

Figure 2:
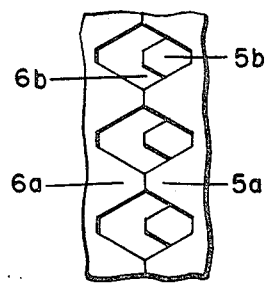

For a more complete understanding of the invention reference may be had to the following detailed description thereof taken in connection with the accompanying drawings wherein:

FIG. 1 is a longitudinal section of a coupling embodying this invention in engaged or torque-transmitting position of its constituent parts, only the upper portion of that coupling being shown in FIG. 1, the lower portion thereof being substantially identical with the upper portion; and FIG. 2 is a front view of a portion of the two cooperating pairs of gears of the coupling of FIG. 1.

In FIG. 1 reference character 1 has been applied to indicate a rotatable shaft. The substantially cylindrical body 2 of magnetizable material is mounted on shaft 1 in such a way that it can rotate jointly with shaft 1, but not rotate relative to shaft 1. Slip ring 3 is mounted on body 2 and electrically insulated from the latter by insulation 3a. Body 2 of magnetizable material is provided with a toroidal recess receiving a toroidal coil 4 electrically insulated from body 2 as indicated at 4a. Coil or winding 4 may be energized by means of slip ring 3 while shaft 1 and body 2 of magnetizable material are rotating. This may be achieved by conductively connecting one end of coil 3 to slip ring 4 and grounding the other end of coil 4. As an alternative, body 2 of magnetizable material may be provided with two sliprings (not shown) of which each is conductively connected to one of the two ends or terminals of coil 4. At the left side of body 2 of magnetizable material, i.e., at the side thereof where the recess receiving coil 4 is open, body 2 is provided with a pair of concentric or coaxial annular spur gears 5a, 5b. The diameter of spur gear 5a is relatively large and it is arranged at the radially outer portion of the left end surface of body 2 of magnetizable material. The diameter of spur gear 5b is relatively small and it is arranged at the radially inner portion of the left end surface of body 2 of magnetizable material. The gears 5a, 5b are arranged in such a way that their teeth lie on identical radii of gears 5a, 5b and that their inter-tooth gaps likewise lie on identical radii of gears 5a, 5b. In other words, the teeth of gears 5a, 5b are radially aligned and the same applies as to the gaps formed between the teeth thereof. Parts 2, 3, 4, 5a and 5b form jointly the right coupling member of the coupling. The coupling further includes a left coupling member which will now be described.

The left coupling member includes a pair of coaxial or concentric annular spur gears 6a, 6b. Spur gear 6a is juxtaposed to spur gear 5a and has the same diameter as spur gear 5a and can be brought into cooperative torque-transmitting engagement with spur gear 5a. Spur gear 6b is juxtaposed to spur gear 5b and has the same diameter as spur gear 5b and can be brought into cooperative torque-transmitting engagement with spur gear 5b. Spur gears 6a, 6b are arranged in such a way that the teeth of one and the inter-tooth gaps of the other lie on identical radii of gears 6a, 6b. In other words, each of the teeth of gear 6a is radially aligned with one of the inter-tooth gaps, or gaps between the teeth, of gear 6b, and vice versa. Gear 6a is integral with toroidal projection 7 of magnetizable material, and gear 6b is integral with another toroidal projection 7b of magnetizable material. Projections 7a, 7b and gears 6a, 6b form two armatures which may be moved from left to right—as seen in FIG. 1—under the action of a magnetic field established by coil or winding 4. Gear 6a and projection 7a form a first armature, and gear 6b and projection 7b form a second armature, and each of these two armatures may be moved axially, i.e., in the direction of shaft 1, independent of the other. Reference numeral 8 has been applied to indicate a substantially annular torque-transmitting member recessed in an annular cavity defined by projections 7a, 7b. Torque-transmitting member 8 is provided with a radially outer annular spur gear 9a and with a radially inner annular spur gear 9b. Both these spur gears have axially extending teeth, i.e., teeth that extend in the direction of shaft 1. Projection 7a is provided with axially extending teeth forming a spur gear 10a cooperatively engaging gear 9a of torque-transmitting member 8. Gears 9a, 10a allow relative axial movement of parts 7a and 8 but preclude relative rotational movements thereof. Projection 7b is provided with axially extending teeth forming a gear 10b cooperatively engaging gear 9b of torque-transmitting members. Gears 9b, 10b allow axial movements of parts 7b and 8, but preclude relative rotational movement thereof. Pins 8a, 8b are integral with torque-transmitting member 8, pins 11a are integral with projection 7a of gear 6a and pins 11b are integral with projection 7b of gear 6b. Helical springs—of which but one is shown in FIG. 1—have ends engaging pins 8a, 11a and biasing gear 6a and its projection 7a from right to left, as seen in FIG. 1, i.e., away from coupling member 2, 3, 4, 5a, 5b. Helical springs 12b—of which but one has been shown in FIG. 1—have ends engaging pins 8b, 11b and biasing gear 6b and its projection 7b from right to left, as seen in FIG. 1, i.e., away from coupling member 2, 3, 4, 5a, 5b.

Upon energization of coil or winding 4 the gear and gear projection units 6a, 7a and 6b, 7b tend to move from left to right under the action of a magnetic field established by coil or winding 4, parts 7a, 7b forming a flux path of relatively low reluctance. The magnetic action of the field established by coil or winding 4 is opposed by helical springs 12a, 12b, but the bias of these springs is overcome by the action of the magnetic field, as a result of which gears 6a, 6b are moved from left to right.

Assuming that the teeth of gears 5a, 6a are in a registering position, resulting in abutting engagement of the teeth of gears 5a, 6a, as illustrated in FIG. 2. In such an instance the teeth of gear 5b will be axially aligned with the inter-tooth gaps of gear 6b, as shown in FIG. 2, resulting in cooperative torque-transmitting engagement of gears 5b, 6b. It will be apparent that gears 5b, 6b may engage, though gears 5a, 6a cannot engage, the independent freedom of axial movement of units 6a, 7a and 6b, 7b being responsible for this fact.

It will also be understood that the reverse of the above situation may occur, i.e., the teeth of gears 5b, 6b may be in registering abutment, thus making it impossible for these two gears to come into cooperative torque-transmitting engagement. In that instance the gears 5a, 6a will be in such a position that the teeth of the one are axially in registry with the inter-tooth gaps of the other, thus assuring proper functioning of the coupling. Thus torque is transmitted from shaft 1 by the intermediary of gears 5a, 6a, or by the intermediary of gears 5b, 6b, to torque-transmitting member 8 which drives a device (not shown) to which it is secured and which is intended to be driven or operated by shaft 1.

It will be apparent from the foregoing that couplings embodying this invention include two cooperating coaxial coupling members 2, 3, 4, 5a, 5b and 6a, 7a, 6b, 7b. Ring-shaped or annular gears 5a, 5b of the first-mentioned coupling member and ring-shaped or annular gears 6a, 6b of the last mentioned coupling member are angularly related in such a way that when the teeth of gears 5a, 6a are in abutting registery, the teeth of gear 5b are in registry with inter-tooth gaps of gear 6b. Should the teeth of gears 5b, 6b be in abutting registry, precluding torque-transmitting engagement of gears 5b, 6b, then the teeth of gear 5a will be in axial registry with the inter-tooth gaps in gear 6a and thus gears 5a, 6a may be brought into cooperative, torque-transmitting engagement.

It will be further apparent from the above that electromagnetic gear couplings according to this invention include an annular torque-transmitting member 8 having a radially inner system 9b of axially extending gear teeth, and a radially outer system 9a of axially extending gear teeth. The coupling includes a first armature 7b having axially extending gear teeth 10b in meshing engagement with said radially inner system 9b of axially extending gear teeth of torque-transmitting member 8 and movable axially relative to torque-transmitting member 8 against the bias of spring means 12b interposed between torque-transmitting member 8 and first armature 7b. The first armature 7b is provided with an annular system 5b of substantially radially extending gear teeth. The coupling further includes a second armature 7a having axially extending gear teeth 10a in meshing engagement with the radially outer system 9a of gear teeth of torque-transmitting member 8, and movable relative to torque-transmitting member 8 against the bias of spring means 12a interposed between torque-transmitting member 8 and second armature 7b. The aforementioned second armature 7b is further provided with an annular system 5a of substantially radially extending gear teeth. The coupling further includes a rotatable solenoid winding 4 supported by a rotatable core 2 of magnetizable material arranged in coaxial relation to torque-transmitting member 8, and establishing a flux path for energizing first armature 7b and second armature 7a to move armatures 7b, 7a axially against the bias of helical spring means 12b, 12a. Rotatable core 2 is provided with a pair of coaxial annular gears 5a, 5b having substantially radially extending gear teeth. Gear 5a is adapted to engage the system of gear teeth 6a on armature 7a and the gear 5b is adapted to engage the system of gear teeth 6b on armature 7b. The systems of gear teeth 6a, 6b and each of gears 5a, 5b are fixedly angularly related in such a way that when the system of gear teeth 6a is precluded by the position of gear 5a from moving axially, the system of gear teeth 6b is free to move axially into meshing engagement with gear 5b. On the other hand, if the system of gear teeth 6b is precluded by the position of gear 5b from moving axially, the system of gear teeth 5a is free to move axially into meshing engagement with gear 6a.

For purposes of identification part 5a may be referred to as the first spur gear, part 5b as the second spur gear, part 6a as the third spur gear, and part 6b as the fourth spur gear. It is apparent from the above and from FIG. 1 that spur gears 5a, 5b, on the one hand, and spur gears 6a, 6b, on the other hand, have fixed or unalterable angular relations. Spur gears 5a, 5b are integral parts of body 2 and, therefore, their angular relation is fixed, or unalterable. Spur gears 6a, 6b are precluded by gears 9a, 10a and 9b, 10b from rotating relative to torque-transmitting member 8, and hence the spur gears 6a, 6b have fixed or unalterable angular relations. Because of these facts either the pair of spur gears 5a, 6a or the pair of spur gears 5b, 6b must be in a registering, engagement-allowing relation. In other words, it is not possible that both sets of spur gears 5a, 5b and 6a, 6b are in abutting, engagement-precluding relation or positions.

While, in accordance with the patent statutes, I have disclosed the details of a preferred embodiment of the invention, it is to be understood that many of these details are merely illustrative, and variations in their precise form will be possible, or necessary, depending upon the particular nature of application.

I desire, therefore, that my invention be limited only to the extent set forth in the appended claims, and by the prior art.

I claim as my invention:

1. An electromagnetic gear coupling for transmitting torques from a driving shaft to a driven shaft comprising in combination:
    (a) a cooperating pair of coaxial coupling members, said pair of coupling members including,
    (b) a first coupling member having a first spur gear and a second spur gear, said first spur gear and said second spur gear each being ring-shaped and arranged in coaxial relation and each including gear teeth and defining inter-tooth gaps, said pair of coupling members further including,
    (c) a second coupling member having a third spur gear and fourth spur gear, said third spur gear and said fourth spur gear being ring-shaped and each including gear teeth and defining intertooth gaps, said third spur gear being shaped for torque-transmitting engagement with said first spur gear and said fourth spur gear being shaped for torque-transmitting engagement with said second spur gear,
    (d) means providing freedom of independent relative axial movement between said third spur gear and said first spur gear and means providing independent relative axial movement between said fourth spur gear and said second spur gear,
    (e) electromagnetic means for establishing a magnetic field tending to cause against spring bias relative axial movement between, and tending to cause engagement of, said third spur gear and said first spur gear, and of said fourth spur gear and of said second spur gear; and
    (f) said first spur gear, said second spur gear, said third spur gear and said fourth spur gear being fixedly angularly related in pairs in such a way that when said teeth of said first spur gear and said teeth of said third spur gear are in abutting engagement precluding relation, said teeth of said second spur gear are in registering engagement allowing relation with said inter-tooth gaps of said fourth spur gear, and when said teeth of said second spur gear and said teeth of said fourth spur gear are in abutting engagement-precluding relation, said teeth of said first spur gear are in registering engagement-allowing relation with said inter-tooth gaps of said third spur gear.

2. An electromagnetic gear coupling as specified in claim 1 wherein said first spur gear, said second spur gear, said third spur gear, and said fourth spur gear are arranged in pairs of which one forms part of one of said pair of coupling members and the other forms part of the other of said pair of coupling members, said teeth of each spur gear of one pair of said pairs of spur gears being arranged along identical radii and said teeth of each spur gear of the other pair of said pairs of spur gears being angularly displaced.

3. An electromagnetic coupling as specified in claim 1 wherein one of said pair of coupling members supports an electromagnetic energizing winding, and the other of said pair of coupling members comprises an axial projection of magnetizable material on each said third spur gear and fourth spur gear, said axial projection on said third spur gear and said axial projection on said fourth spur gear each forming a flux path for a magnetic flux established by said winding.

4. An electromagnetic coupling as specified in claim 3 comprising a first additional pair of spur gears with axially extending teeth, one of said first additional pair of spur gears being on said projection of said third spur gear and the other of said first additional pair of spur gears being on said projection of said fourth spur gear, and an annular torque-transmitting member arranged in coaxial relation to said pair of coupling members and having a second adidtional pair of spur gears with axially extending teeth, one of said second additional pair of spur gears being in cooperative engagement with one of said first additional pair of spur gears to guide said projection of said third spur gear and to preclude any rotary motion of said projection of said third spur gear relative to said torque-transmitting member, and the other of said second additional pair of spur gears being in cooperative engagement with the other of said first additional pair of spur gears to guide said projection of said fourth spur gear and to preclude any rotary motion of said projection of said fourth spur gear relative to said torque-transmitting member.

5. An electromagnetic gear coupling as specified in claim 4 including spring means interposed between said torque-transmitting member and said third spur gear, and spring means interposed between said torque-transmitting member and said fourth spur gear, biasing said third spur gear and said fourth spur gear away from one of said pair of coupling members.

6. An electromagnetic gear coupling for transmitting torques from a driving shaft to a driven shaft comprising in combination:
    (a) an annular torque-transmitting member having a radially inner system of axially extending gear teeth and a radially outer system of axially extending gear teeth;
    (b) a first armature having axially extending gear teeth in meshing engagement with said radially inner system of gear teeth of said torque-transmitting member and movable axially relative to said torque-transmitting member against the bias of spring means interposed between said torque-transmitting member and said first armature, said first armature being further provided with an annular system of substantially radially extending gear teeth;
    (c) a second armature having axially extending gear teeth in meshing engagement with said radially outer system of gear teeth of said torque-transmitting member and movable axially relative to said torque-transmitting member independently from said first armature against the bias of spring means interposed between said torque-transmitting member and said second armature, said second armature being further provided with an annular system of substantially radially extending gear teeth;
    (d) a rotatable solenoid winding supported by a rotatable core of magnetizable material arranged in coaxial relation to said torque-transmitting member and establishing flux paths for energizing said first armature and said second armature to move axially against the bias of said spring means, said rotatable core having a pair of coaxial annular gears having substantially radially extending gear teeth, one of said pair of gears being adapted to engage the system of gear teeth on said first armature and the other of said pair of gears being adapted to engage the system of gear teeth on said second armature; and
    (e) said system of gear teeth on said first armature, said system of gear teeth on said second armature, and each of said pair of gears on said rotatable core being angularly related in such a way that when said first armature is precluded from moving axially relative to said torque-transmitting member, said second armature is free to move axially relative to said torque-transmitting member, and when said second armature is precluded from moving axially relative to said torque-transmitting member, said first armature is free to move axially relative to said torque-transmitting member.

7. An electromagnetic gear coupling as specified in claim 6 wherein said system of substantially radially extending gear teeth of said first armature, said system of substantially radially extending gear teeth of said second armature, and said gears of said rotatable core include a first pair of gears having teeth arranged along identical radii and a second pair of gears having teeth being angularly displaced in such a way that the teeth of one gear of said second pair of gears and the inter-tooth gaps of the other gear of said second pair of gears are arranged along identical radii.

References Cited

UNITED STATES PATENTS

| 1,989,984 | 2/1935 | Hope | 192—84 |
| 2,942,710 | 6/1960 | Wiedmann | 192—84 |
| 3,091,316 | 5/1963 | Huffman | 192—846 X |

FRED C. MATTERN, JR., *Primary Examiner.*

ARTHUR T. McKEON, *Examiner.*